(12) United States Patent
Lehto

(10) Patent No.: US 8,500,959 B2
(45) Date of Patent: Aug. 6, 2013

(54) METHOD FOR PERFORMING PYROLYSIS AND A PYROLYSIS APPARATUS

(75) Inventor: Jani Lehto, Tampere (FI)

(73) Assignee: Metso Power Oy, Tampere (FI)

( * ) Notice: Subject to any disclaimer, the term of this patent is extended or adjusted under 35 U.S.C. 154(b) by 321 days.

(21) Appl. No.: 12/414,219

(22) Filed: Mar. 30, 2009

(65) Prior Publication Data
US 2009/0242376 A1 Oct. 1, 2009

(30) Foreign Application Priority Data

Mar. 31, 2008 (FI) .................................. 20085261

(51) Int. Cl.
*C10B 49/22* (2006.01)

(52) U.S. Cl.
USPC .................. 201/12; 201/31; 202/99; 422/145

(58) Field of Classification Search
USPC .................. 201/12, 16, 31; 202/99, 108, 134, 202/135, 262, 269; 422/142, 145; 208/410; 165/104.18; 34/589
See application file for complete search history.

(56) References Cited

U.S. PATENT DOCUMENTS

| | | | | |
|---|---|---|---|---|
| 2,521,195 | A | * | 9/1950 | Wheeler, Jr. ................... 422/144 |
| 2,985,515 | A | * | 5/1961 | McKinley ...................... 422/143 |
| 3,476,649 | A | * | 11/1969 | Ledent ............................. 201/12 |
| 3,597,327 | A | * | 8/1971 | Squires ........................... 201/12 |
| 3,921,307 | A | * | 11/1975 | Marek et al. .................... 34/363 |
| 4,274,941 | A | * | 6/1981 | Janssen et al. ............... 60/39.12 |
| 4,324,620 | A | | 4/1982 | Ito et al. |
| 4,430,195 | A | * | 2/1984 | Oltrogge ....................... 208/410 |
| 4,436,588 | A | | 3/1984 | Rammler et al. |
| 4,447,297 | A | | 5/1984 | Shang et al. |
| 4,700,639 | A | | 10/1987 | Esterson et al. |
| 4,740,216 | A | * | 4/1988 | Allard ............................... 48/76 |
| 4,891,459 | A | | 1/1990 | Knight et al. |

(Continued)

FOREIGN PATENT DOCUMENTS

| | | |
|---|---|---|
| EP | 0116425 A1 | 8/1984 |
| EP | 0513051 | 12/1994 |
| FI | 117512 | 11/2006 |
| WO | WO-9706886 | 2/1997 |

(Continued)

*Primary Examiner* — Jill Warden
*Assistant Examiner* — Joye L Woodard
(74) *Attorney, Agent, or Firm* — Novak Druce Connolly Bove + Quigg LLP

(57) ABSTRACT

A pyrolysis apparatus comprises a substantially closed pyrolyzer (4), a supply inlet for supplying pyrolyzable fuel to the pyrolyzer (4), an outlet for taking hot bed material in particle form out of the pyrolyzer, one or more exit outlets (6) for taking condensible gaseous substances separated from the fuel to be pyrolyzed out of the pyrolyzer, a condenser (8) for condensing the condensible gaseous substances into pyrolysis oil, and a line (7) for transferring the condensible gaseous substances from the exit outlet of the pyrolyzer (4) to the condenser (8). The means for maintaining pyrolysis conditions in the pyrolyzer (4) comprise an inlet for taking hot bed material in particle form into the pyrolyzer and means (5) for supplying fluidizing gas to the pyrolyzer.
The pyrolyzer (4) is a chamber bounded directly by a furnace (1) of a bubbling fluidized bed boiler, through which chamber fluidized bed material is arranged to be circulated between the inlet and the outlet. Means (5) for supplying fluidizing gas are divided over an area between the inlet (11) and the outlet (12) in the pyrolyzer (4) so that they create a cross-flow of fluidizing gas in relation to the transfer direction (S) of the bed material and fuel.

13 Claims, 2 Drawing Sheets

U.S. PATENT DOCUMENTS

| | | | |
|---|---|---|---|
| 5,728,271 A | 3/1998 | Piskorz et al. | |
| 6,808,390 B1 * | 10/2004 | Fung | 432/14 |
| 6,814,940 B1 | 11/2004 | Hiltunen et al. | |
| 6,949,224 B1 | 9/2005 | Miyoshi et al. | |
| 2006/0000425 A1 | 1/2006 | Kokko | |

FOREIGN PATENT DOCUMENTS

| | | |
|---|---|---|
| WO | WO-02083816 | 10/2002 |
| WO | WO-03106590 | 12/2003 |
| WO | WO-2007137330 | 12/2007 |

* cited by examiner

METHOD FOR PERFORMING PYROLYSIS AND A PYROLYSIS APPARATUS

BACKGROUND OF THE INVENTION

1. Field of the Invention

The invention relates to a method for performing pyrolysis, which is of the type presented in the preamble of the appended claim 1. The invention further relates to pyrolysis apparatus according to the preamble of the appended claim 8.

2. Description of Related Art

Pyrolysis refers to conversion of fuel in inert conditions and high temperature into gaseous form, which during condensation forms oily liquid that comprises different organic compounds. Inert conditions in connection with pyrolysis refer to oxygen-free conditions, wherein combustion of fuel is avoided. Tar distillation is one example of a pyrolysis process known for ages.

In a pyrolysis process fuel is pyrolyzed, the gaseous compounds formed in the reaction are separated from carbonization residue, and they are condensed into pyrolysis oil, which may be used, for example, as fuel or it may be processed further into different chemicals. Production of pyrolysis oil from different bio-based, for example wood based fuels has been studied with the purpose of replacing coal and heavy fuel oil with it. One advantage of pyrolysis oil is its easy transportation in comparison to biomass that is difficult to transport, when taking into account the energy content of fuels.

Examples of development of pyrolysis processes include several patent publications, for example, U.S. Pat. Nos. 4,891,459; 5,728,271; EP 513051 and U.S. Pat. No. 6,814,940. The pyrolysis technique disclosed in these publications is based on the fluidization of solid, for example biomass-based fuel with inert fluidizing gas at approx. 400 to 600° C., possibly in the presence of fluidized bed material. The fuel to be pyrolyzed in a reactor is supplied to the lower part of the reactor, from where it flows upwards with fluidizing gas. The bed material and carbon residue are separated from the gases flowing out of the reactor by cyclones or corresponding separators, as shown, for example, in publication EP 513051 (Ensyn Technologies Inc.).

Publication WO 02/083816 discloses pyrolysis in a fluidized bed reactor, where the aim is to keep the bed dense in order to intensify heat transfer from carrier particles (sand) to fuel particles. The actual reactor is a riser, which is surrounded by carrier particles in return circulation, from which particles the combustible residue formed in them in the pyrolysis reaction is being burned off.

Publication WO 97/06886 (Biomass Technology Group B.V) discloses the circulation of heat treated material inside a reactor by means of a special rotating, vertical, upwards-expanding vessel. One application is the pyrolysis of materials. The publication WO 03/106590 (Biomass Technology Group B.V.) discloses a two-phase process, where the first phase comprises mixing of pyrolyzed particles and hot carrier particles in a mixing chamber, and the second phase comprises the separation of pyrolysis gases from a downward-flowing mixture in a reactor chamber.

The patent FI 117513 (Valtion teknillinen tutkimuskeskus, Technical Research Centre of Finland) discloses a method, where a pyrolyzer is placed in connection with a fluidized bed boiler burning solid fuel, which pyrolyzer utilizes in the pyrolysis the energy content of the hot inert bed material (sand) of the fluidized bed boiler. Different fuel is fed to the pyrolyzer than to the fluidized bed boiler. According to one alternative (FIG. 3) the pyrolyzer is placed as a part of the furnace structure of the fluidized bed boiler and connected to the internal material circulation of bed material.

In the above-described processes, especially when the pyrolyzed material is solid fuel with varying particle size, it is a challenge to have such residence times that the material is pyrolyzed at optimum efficiency. To ensure this, circulation solutions must be developed in the pyrolysis reactor in order to ensure that the material remains in pyrolysis conditions as long as possible.

BRIEF SUMMARY OF THE INVENTION

The purpose of the invention is to provide a new method, which reaches optimum efficiency by a simple flow-through solution. The invention is intended to be used especially in connection with a fluidized bed boiler that produces energy from fuel by a combustion process, wherein in order to maintain pyrolysis temperature it utilizes the thermal energy produced by the boiler at least partly. To achieve this aim, the method according to the invention is primarily characterized in what will be presented in the characterizing part of the appended claim 1.

When the pyrolyzed fuel and the fluidized bed material from the boiler are carried through the pyrolysis reactor transversely to the flow direction of fluidizing gas, it is possible to maintain the fuel in pyrolysis conditions with such a residence time that all fuel is pyrolyzed as perfectly as possible. The gases created in the pyrolysis, however, do not come into contact with fuel and fluidized bed material for a corresponding period of time, because the flows cross each other.

According to an advantageous embodiment of the invention the pyrolyzer is bounded immediately by the furnace of the fluidized bed boiler, for example in such a manner that it is placed outside the furnace and the fluidized bed material enters the pyrolyzer from the furnace via an inlet and returns to the furnace through an outlet. The pyrolyzer can therefore be integrated especially in connection with a bubbling fluidized bed boiler (BFB boiler), especially in such a manner that the pyrolyzer and the furnace share a common wall, which comprises said inlet and outlet. Thus, the fluidized bed material of the boiler can be utilized with optimum efficiency by a compact solution.

The bed material is transferred by the principle of communicating vessels, because when fluidized, it acts like a liquid. The transfer of the fuel to be pyrolyzed and fluidized bed material through the pyrolysis reactor can be expedited by directional fluidizing gas nozzles. In addition, it is possible to adjust the temperature in the pyrolysis reactor by additional heating or cooling, in which case the process does not depend solely on the temperature of the bed material and flow-through rate.

BRIEF DESCRIPTION OF THE SEVERAL VIEWS OF THE DRAWINGS

In the following, the invention will be described in more detail with reference to the appended drawings, in which.

DETAILED DESCRIPTION OF THE INVENTION

Figure 1:
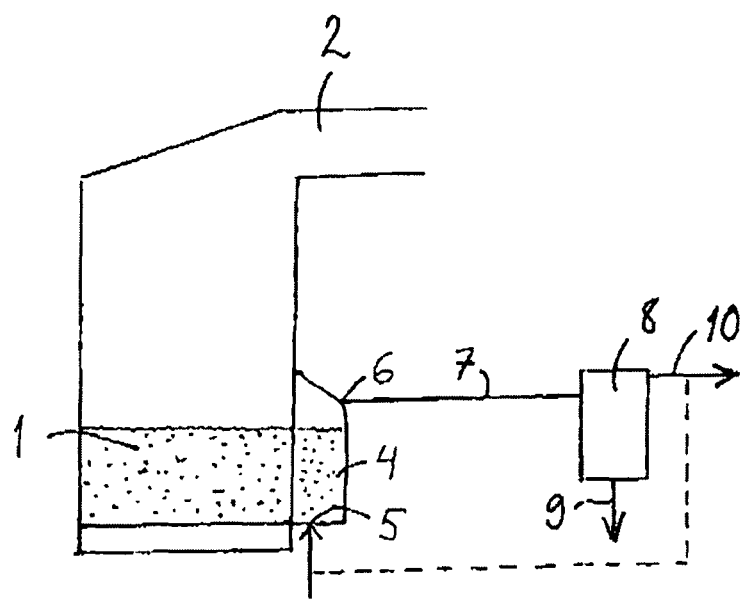
FIG. 1 shows schematically a pyrolysis process arranged in connection with the bubbling fluidized bed boiler.

FIG. 1 schematically shows the process in connection with a combustion boiler. In a combustion boiler the material forms a so-called bubbling fluidized bed (BFB). The boiler comprises a furnace 1 and a flue gas channel 2 exiting the furnace. Fluidized bed material formed of solid particles circulates in the furnace as internal circulation. The fluidized bed material can be, for example, inert material, such as sand. The supply of liquid or solid fuel, fluidizing air and combustion air into the furnace, as well as the elements relating to the generation of steam in the boiler are not presented, as they are irrelevant to the invention.

In FIG. 1, a pyrolysis process is arranged in connection with a boiler, in which process it is possible to pyrolyze fuel, which may be the same fuel that is supplied to the furnace of the boiler, or a different fuel. The same plant can therefore simultaneously produce energy in the form of steam and/or electricity by combustion process and, by means of the thermal energy produced by the combustion process, fuel in the form of pyrolysis oil. The pyrolysis process is especially suitable for solid, bio-based fuels, such as wood chips, sawdust, straw, different logging waste and other bio-based waste, etc. It is also possible to use semi-bio-based fuels, such as peat. It is possible that bio-based or semi-bio-based solid fuel is burned in the furnace 1 of the boiler, which fuel is the same fuel that is supplied to the pyrolysis process, or a different bio-based or semi-bio-based fuel. It is also possible that coal, peat or fuel oil is burned in the boiler and the pyrolyzed fuel is bio-based, solid fuel. When the material to be pyrolyzed is called fuel, it is important to keep in mind that the material does not burn in the pyrolysis process, but emits combustible gaseous materials, which after condensation into a liquid can be recovered, stored, transferred and burned elsewhere in order to utilize their energy content. Pyrolysis residue, i.e. coke, is left from the pyrolyzed material, which residue has an energy content and which can, in turn, be burned separately from the pyrolysis process, preferably in the furnace.

The pyrolysis process comprises a pyrolysis reactor, i.e. a pyrolyzer 4, which is substantially a closed chamber and which is placed in connection with the furnace 1, means 5 for supplying fluidizing gas to the pyrolyzer 4, as well as means for directing the condensible gaseous materials and the fluidizing gas out of the pyrolyzer. The condensible gaseous materials are directed via line 7 to a condenser 8, where they are condensed in one or more phases into pyrolysis oil, which is taken out via line 9. Incondensible gases are removed via line 10 to further processing. These gases may be re-used after a scrubber, for example as fluidizing gas in the pyrolyzer (dashed line).

The pyrolysis process is continuous, and it utilizes the energy content of the inert bed material of the combustion boiler. The bed material is taken from the internal circulation of the furnace 1, a part of which material is directed via the pyrolysis reactor 4 in a manner described later.

A suitable inert gas is used as fluidizing gas, such as incondensible gases created in pyrolysis, circulation gas of the boiler, from which oxygen has been burned off, or some other inert gas, such as nitrogen. Fluidizing gas is dried waterless, if necessary, before it is supplied to the pyrolyzer.

FIGS. 2 to 5 show in more detail a pyrolyzer 4 integrated into a boiler in different views. The figures show that the reactor chamber and the boiler furnace 1 have a common wall. The common wall of the furnace and the chamber and the other walls of the chamber may comprise water tubes, which are connected to the water-steam-circulation of the boiler. The reactor comprises an inlet section 4a, an actual pyrolysis section 4b and an outlet section 4c, which are separated from each other by intermediate walls directed downwards from the chamber ceiling so that flow paths for material flowing through the reactor remain between the intermediate walls and the bottom of the chamber.

An inlet duct 11 opens towards the inlet section 4a on the wall of the furnace, via which duct the hot bed material enters the reactor. Correspondingly, an outlet 12 opens toward the outlet section 4c, via which outlet the material that has passed through the reactor and comprises inert material and carbonization residue (combustible material, mainly coke), enters the furnace. The inlet 11 can be one opening or a series of two or more openings, as shown in the figure. The outlet 12 may also be formed of two or more openings. On the bottom of the chamber, are fluidizing nozzles 5 in each section, and an outlet for gases created in pyrolysis and fluidizing gases, which outlet 6 is on the ceiling of the chamber at the pyrolysis section 4b. In order to distribute fluidizing gas to fluidizing nozzles, it is brought to sections 13 below the chamber, which sections are located directly below the corresponding sections 4a, 4b and 4c of the chamber.

Figure 2:
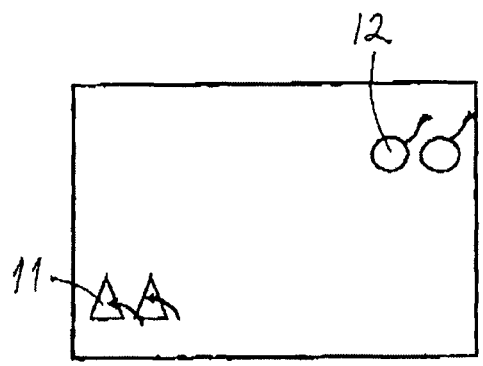
FIGS. 2 to 5 show a pyrolysis reactor in a front view from the direction of the furnace, in a vertical cross-section from the side, in a vertical cross-section from outside the furnace, and in a horizontal cross-section in a top view.
Figure 3:
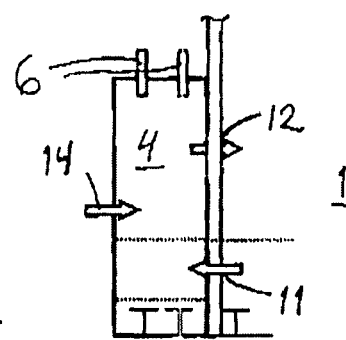
Figure 4:
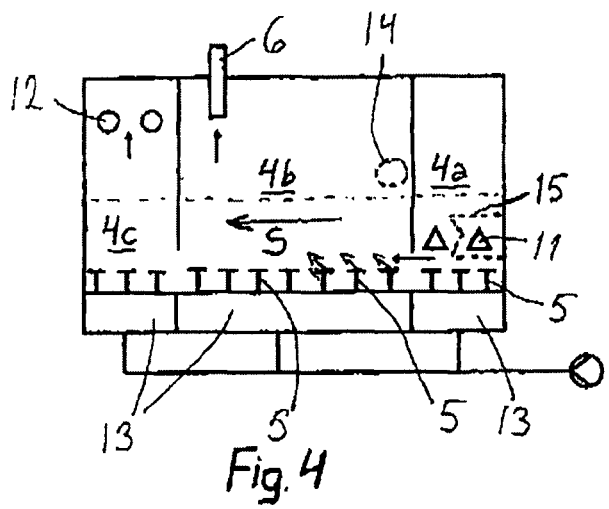

FIGS. 2 and 4 show best the locations of the inlet 1 and the outlet 12 in the height direction. The inlet 11 is located lower than the outlet 12 so that with the bed material of the pyrolysis chamber it is possible to simultaneously create a "sand seal" i.e. a gas lock for preventing back flow. The upper surface of the fluidized bed material is described by dashed lines in FIGS. 3 and 4. The inlet 11 of the supply section 4a is below the surface of the bed material.

Figure 5:
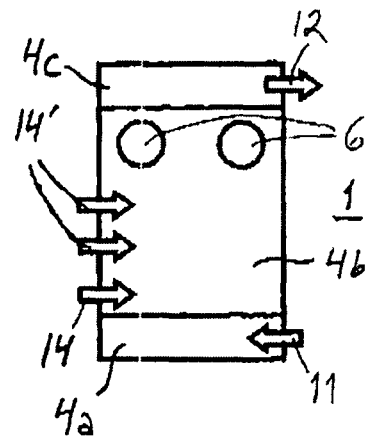

The fuel to be pyrolyzed is supplied from the supply inlet 14 to the initial end of the reactor, where it is mixed with bed material. The supply inlet can be brought to the inlet section 4a or to the initial end of the pyrolysis section 4b at a point where bed material moves to the pyrolysis section 4b forming the actual pyrolysis zone, as shown in FIG. 5. Fuel is carried with the bed material primarily horizontally through the pyrolysis section 4b at the same time as it is fluidized from below with substantially oxygen-free pyrolysis gas blown through nozzles 5 or the like at the bottom of the pyrolysis section. Thus, the organic compounds that are separated from fuel in the temperature (approx. 400 to 600° C.) required by pyrolysis are carried in gas form upwards with fluidizing gas, and they are directed out at the top through an exit outlet 6. Thus, a bubbling fluidized bed is formed in the pyrolysis section 4b by the effect of fuel and bed material. Even though the fluidizing gas causes the upward and downward movement of fuel and fluidized bed material particles, they gradually move from the inlet section end to the outlet section 4c end, i.e. their main flow direction through the pyrolysis section 4b (horizontal arrow S) is therefore transverse to the supply direction of fluidizing gas (from bottom to the top).

With the described cross flow, where the material to be pyrolyzed continuously moves transversely to the flow-through direction of the fluidizing gas, the residence time of the pyrolyzable fuel in the process can be made longer than the contact time of the gaseous components created in pyrolysis with the pyrolyzed material. This way it can be ensured that pyrolysis for all fuel particles takes place with as good a yield as possible. When moving transversely to the flow direction of the wide front of the fluidizing gas, all the particles come into contact repeatedly with new, fresh fluidizing gas at a temperature favorable to pyrolysis. The residence time can always be dimensioned according to the largest fuel particle, if the pyrolyzable material varies in particle size, as is often the case with bio-based/semi-bio-based fuel, which may be very heterogeneous in other respects as well.

FIG. 5 shows best that there may be fuel supply inlets even after the initial end of the pyrolysis section 4b (arrows 14'). Thus, fuel supply can be divided to take place in several points along the flow direction S of bed material. Thus, the bed material/fuel-ratio remains even over the entire length of the pyrolysis zone, because new, fresh fuel can always be supplied as the reactions proceed.

The fluidizing rate, i.e. the gas transfer rate across the flow of pyrolyzed material, and the residence time of material can be adjusted independently. The supply rate of fuel can affect the residence time of fuel in the pyrolysis process and the bed material/fuel-ratio, while fluidization may affect the mass flow of hot bed material and as a result of that, the heat capacity flow. The bed material flow-through through the entire pyrolyzer can be adjusted by the fluidizing rate of the outlet chamber 4c.

The temperature required by the pyrolysis reaction can therefore be created mainly by hot fluidized bed material taken from the furnace 1 of the boiler and releasing heat to the process. If necessary, it is possible to place a heat exchanger 15 in the inlet section 4a, with which the material temperature of can be adjusted to a desired level, i.e. it can be heated more or cooled, if necessary. The temperature may be adjusted to some extent by means of the fluidizing gas temperature as well.

When the pyrolyzer 4 is placed immediately next to the furnace 1, the advantage is that the transfer of hot bed material via pipes can be avoided. Bed material from the furnace 1 enters directly the pyrolyzer 4 and returns from the pyrolyzer directly to the furnace. The process is also easy to interrupt only by stopping the supply of fuel to the pyrolyzer, because bed material may still circulate through the pyrolyzer or its circulation may also be stopped by interrupting fluidization. The pyrolyzer is also easy to start as long as the boiler is running, i.e. the combustion process is on. In a pyrolysis reactor integrated to a boiler the carbonization residue of pyrolysis is never wasted, because it returns with the bed material to the furnace 1 and is burned there.

The pyrolyzer is also easy to build afterwards in connection with a bubbling fluidized bed boiler, because it does not change any substantial structures or functions of the boiler.

The arrows in FIG. 4 illustrate how in the initial end of the pyrolysis section 4b the nozzles may be directional nozzles, which in addition to fluidization direct fluidizing gas to the main flow direction S of material. This supply may be used to influence the migration of the material through the pyrolysis section 4b.

The invention is not restricted to the embodiments shown in the figures, but it can be varied within the scope of the inventive idea presented in the claims. The invention may also be used in connection with a boiler arranged with a circulating fluidized bed (CFB), in which case the bed material comes to the pyrolyzer 4 from outside the furnace through a return pipe brought from a separator, e.g. from a cyclone separator. A corresponding inlet 11 can therefore be arranged in another wall of the pyrolyzer than the wall shared with the furnace 1. It is also possible that the pyrolyzer arranged in connection with the circulating fluidized bed boiler is entirely separate from the furnace, in which case bed material is transferred from the pyrolyzer via a return pipe back to the furnace 1.

It is not necessary to change the operating principle of the pyrolyzer in either case.

The invention claimed is:

1. A method for performing pyrolysis in connection with a bubbling fluidized bed boiler comprising a furnace, which contains solid fluidized bed material, said method comprising:
    maintaining pyrolysis conditions in a pyrolyzer which include pyrolysis temperature,
    circulating the solid fluidized bed material of the furnace via the pyrolyzer,
    fluidizing the solid fluidized bed material in the pyrolyzer with fluidizing gas by feeding the fluidizing, gas to the solid fluidized bed material in a flow direction,
    bringing the pyrolysis temperature required by the pyrolysis conditions at least partly with the solid fluidized bed material of the furnace,
    feeding the solid fluidized bed material in a flow direction horizontally through the pyrolyzer and supplying the fluidizing gas below the fluidized bed material so that the solid fluidized bed material flows through the pyrolyzer in the flow direction transversely to the flow direction of the fluidizing gas,
    forming a bubbling fluidized bed of the solid fluidized bed material in the pyrolyzer by means of the fluidizing gas, said bubbling fluidized bed having an upper surface in the pyrolyzer,
    supplying solid fuel in particle form to the solid fluidized bed material in the pyrolyzer in several sequential points along the flow direction of the solid fluidized bed material to provide a flow of fuel carried with the solid fluidized bed material in the flow direction of the solid fluidized bed material,
    separating condensible gaseous substances from the solid fuel under the pyrolysis conditions and collecting the condensible gaseous substances with the fluidizing gas above the solid fluidized bed material,
    directing the condensible gaseous substances separated from the solid fuel from the pyrolyzer to a condenser, and
    separating the condensible gaseous substances in the condenser in liquid form as so-called pyrolysis oil, and wherein the method further comprises:
    dividing the pyrolyzer by means of intermediate walls directed downward from a ceiling to an inlet section, a pyrolysis section and an outlet section,
    forming a gas lock in the pyrolyzer by means of the solid fluidized bed material by feeding the solid fluidized bed material into the pvrolyzer to the inlet region through a feed inlet below the upper surface of the solid fluidized bed material in the inlet section and the pyrolysis section and discharging the solid fluidized bed material from the pyrolyzer in the outlet section through a discharge outlet located higher than the feed inlet and higher than the upper surface of the solid fluidized bed material in the inlet section and the pyrolysis section, the method further comprising:
    supplying fluidizing gas at a fluidizing rate to the solid fluidized bed material in the outlet section comprising the discharge outlet, and
    adjusting flow-through of the solid fluidized bed material through the pyrolyzer by the fluidizing in the outlet section.

2. The method according to claim 1, wherein the pyrolyzer and the furnace of the fluidized bed boiler have a common wall and the bed material is taken directly from the furnace, of the fluidized bed boiler via the feed inlet in the common wall between the furnace and the pyrolyzer and returned to the furnace via the discharge outlet in the same common wall.

3. The method according to claim 1, comprising:
    adjusting the pyrolysis temperature of the pyrolyzer by means of a heat exchanger which is in contact with the solid fluidized bed material inside the pyrolyzer.

4. The method according to any of the preceding claims, wherein the solid fuel in particle from supplied to the solid fluidized bed material is solid, bio-based or semi-bio-based fuel.

5. The method according to claim 1, wherein the method further comprises:

adjusting gas transfer rate across the flow of fuel carried with the solid fluidized bed material and residence time of the fuel in the pyrolyzer independently.

6. The method according to claim 1, wherein the method further comprises:

directing part of the solid fluidized bed material of the furnace via the pyrolyzer by taking said part of the solid fluidized bed material from internal circulation of the furnace.

7. The method according to claim 1, wherein the method further comprises:

discharging pyrolysis residue together with the solid fluidized bed material from the pyrolyzer to the furnace, and burning said pyrolysis residue in the furnace.

8. A pyrolysis apparatus comprising:

a bubbling fluidized bed boiler comprising is furnace, a substantially closed pyrolyzer chamber having a bottom and a ceiling, intermediate walls directed downward from the ceiling to divide the pyrolyzer chamber to an inlet section, a pvroiysis section and an outlet section, a supply inlet for supplying pyrolyzable fuel to the pyrolyzer chamber, means for maintaining pyrolysis conditions in the pyrolyzer chamber, which comprise in the inlet section, a feed inlet for feeding hot bed material in particle form from said furnace to the inside of the pyrolyzer chamber, in the outlet section, a discharge outlet for discharging the hot bed material in particle form out of the pyrolyzer chamber to said furnace, in the pyrolysis section, a pyrolysis zone located inside the pyrolyzer chamber in an area between the inlet section and the outlet section, said feed inlet and said discharge outlet being horizontally spaced within a distance from each other and defining a transfer direction for the bed material and the fuel over said distance between the feed inlet and the discharge outlet in the pyrolyzer chamber, means for supplying fluidizing gas to the pyrolyzer chamber which are distributed over said pyrolysis zone at different points of said distance so that they create a cross-flow of fluidizing gas in relation to the transfer direction of the bed material and fuel, said discharge outlet being located higher than said feed inlet so that a gas lock can he formed in the pyrolyzer chamber by means of the bed material, said outlet section having means for supplying fluidizing gas to the outlet section for adjusting flow-through of the solid fluidized bed material through the pyrolvzer chamber, one or more exit outlets for condensible gaseous substances separated front the fuel to be pyrolyzed out of the pyrolyzer chamber, a condenser for condensation of the condensible gaseous substances into pyrolysis oil, and a line tor transferring the condensible gaseous substances from said one or more exit outlets of the pyrolyzer chamber to the condenser, said pyrolyzer comprising several supply inlets for supplying pyrolyzable fuel along the transfer direction of the bed material and fuel.

9. The apparatus according to claim 8, wherein the means for supplying fluidizing gas are placed on the bottom, and said more exit outlets for condensible gaseous substances are placed on the ceiling.

10. The apparatus according to claim 8 wherein the pyrolyzer chamber is bounded directly by the furnace of the fluidized bed boiler, and fluidizing bed material of the furnace is arranged to be circulated through the pyrolyzer chamber between the feed inlet and the discharge oulet.

11. The apparatus according to claim 8, wherein inside the pyrolyzer chamber there is a heat exchanger for adjusting the pyrolysis temperature.

12. The apparatus according to claim 10, wherein the pyrolyzer chamber and the furnace of the fluidized bed boiler have a common wall, and the feed inlet and the discharge outlet are located in said common wall.

13. The apparatus according to claim 8, wherein the pyrolyzer chamber comprises a bottom and a ceiling and a wall between the bottom and ceiling, said feed inlet and said discharge outlet being located in said wall, with the discharge outlet in a higher position than the feed inlet.

* * * * *